United States Patent Office 2,897,545
Patented Aug. 4, 1959

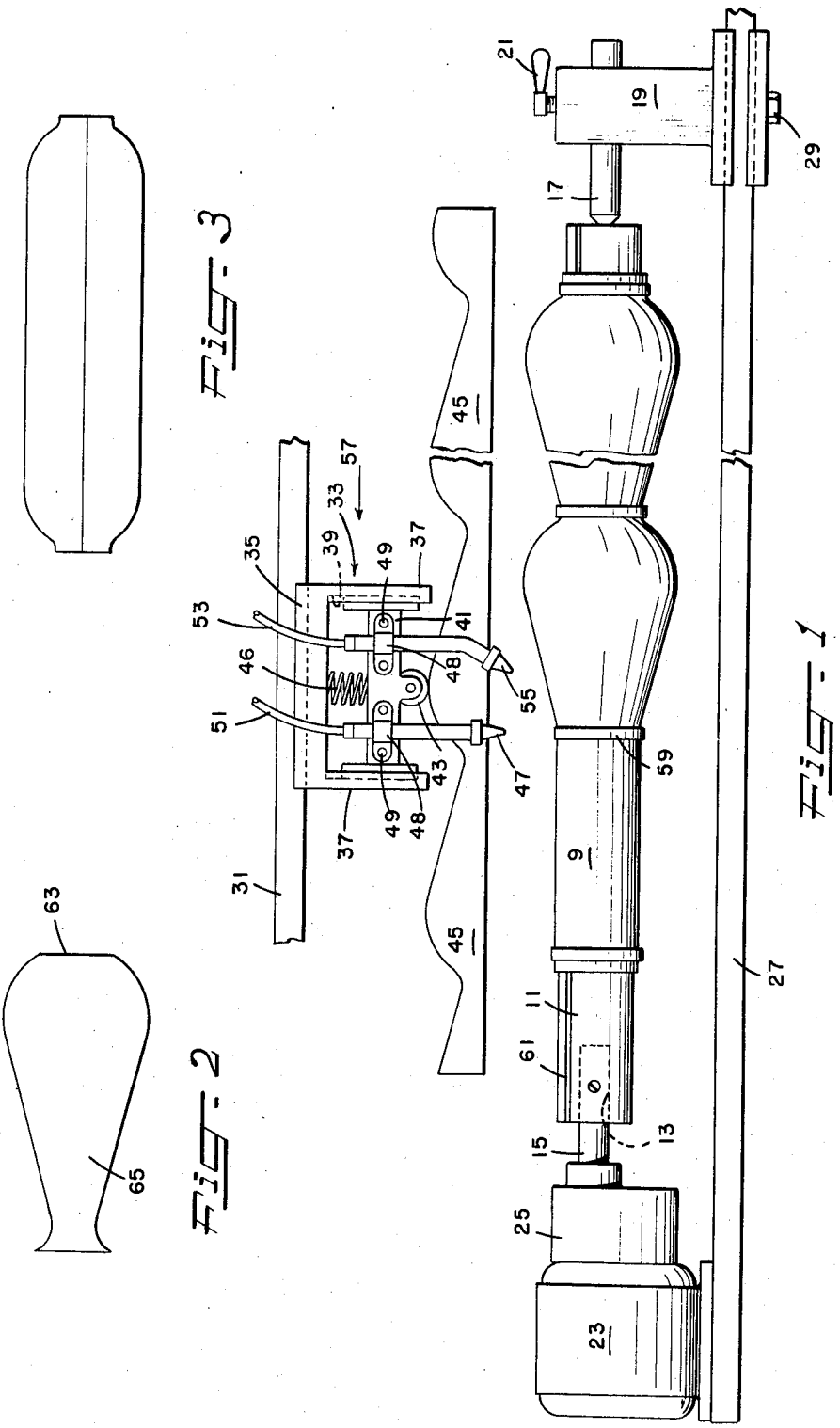

2,897,545

METHOD OF AND APPARATUS FOR SHAPING TUBING MEMBERS

William E. Meissner, Devon, Pa.

Application October 10, 1955, Serial No. 539,400

7 Claims. (Cl. 18—19)

The invention relates to tubing, and particularly to the art of shaping tubing members into desired configurations.

In accordance with the present invention, a marked departure is made from the conventional molding methods generally utilized in providing tubular members with a desirable configuration, which serves either a decorative or utilitarian function in the end product into which the tubing is finally incorporated. In many of these well known molding procedures, the molding material, in a fluid or semi-fluid condition, is placed either over or within a desirably shaped mold and, after being set, assumes its exterior configuration. Where it is desired to reproduce certain specific shapes with some degree of accuracy, these prior methods have not proved to be satisfactory. Further, the numerous manipulative steps entailed in the molding operations and the continuous replacement of molds, where frangible molds are employed, do not readily lend these prior methods to economical mass production techniques. It is therefore a primary object of this invention to provide a new or improved and generally more satisfactory apparatus and method for shaping tubing members.

Another object is the provision of a method for shaping tubing members into various shapes, either simple or complex, which impart to the finished product into which the tubing is incorporated certain desirable decorative or utilitarian features.

Still another object is the provision of a method of shaping tubing members by concomitantly softening and stretching certain selected wall areas of the tubing member into an arched or deformed position, and subsequently setting the same therein.

A still further object is to provide an apparatus adapted to subject a tubing member to a centrifugal force while concomitantly and sequentially heating and cooling certain selected areas of its walls progressively along its length.

A still further object is to provide a method of shaping tubing members in which the degree and configuration of tubing wall deformation or arching can be easily controlled and varied as desired, is simple in practice, and is suitable for economical mass production with readily available materials.

These and other objects and advantages of the invention will be apparent from the following description and accompanying drawing in which:

Fig. 1 is a front view of the apparatus of the present invention;

Fig. 2 is a side view of the container formed by the method of the present invention; and Fig. 3 is a second example of a partially formed article which can be fabricated from tubing shaped in accordance with the method of the present invention.

The invention, in general, is directed to a method and apparatus for deforming cylindrical tubing members into certain desired shapes to adapt the finished articles for various uses, either ornamental or having particular utility. In accordance with the present invention, a tubing member is positioned snugly on a cylindrical mandrel which in turn is rotated at high speed. During rotation, certain selected areas of the tubing are subjected to a softening medium, such as heat, to cause the same to flow or deform more readily in response to the stretching action resulting from the centrifugal force developed by the mandrel rotation. The combined softening and stretching actions enable the selected wall areas of the tubing to bow or arch radially outwardly away from the mandrel, in which position the material is set by subsequent application of a cooling medium, as for example cold air.

The apparatus and method of the present invention is adapted for use with any suitable material which can be readily softened and deformed as hereinafter described. However, a flexible plastic material capable of being molded, shaped, and sealed to itself by heat is preferred. Any of the thermoplastic cellulose derivatives and thermoplastic synthetic resins readily lend themselves for use of the method described herein.

In shaping the tubing in accordance with the present invention, a preformed sleeve or tubing 9 is snugly positioned on the mandrel 11, which is substantially cylindrical throughout its length. The tubing construction is in no way intended to be a limitation on the present invention, and if desired the tubing may be seamless or have a longitudinal or spiral seam or may be formed directly on the mandrel 11 by winding a strip spirally about the mandrel and thereafter heating the same to provide a continuous heat-sealed spiral seam. The mandrel 11, with the tubing applied thereto, is then positioned within the apparatus as shown in Fig. 1, with one of its ends, as for example the hollowed end 13, being rigidly connected to the free end of the shaft 15 for movement therewith. The opposite end of the mandrel is engaged by the center 17 adjustably carried by the support 19 and adapted to be fixed in adjusted position by the lever 21. The shaft 15 is operatively connected to any suitable driving source, as for example the motor 23, through the gear box 25 which permits the rotational speed of the mandrel 11 to be varied for purposes as hereinafter described. To facilitate the use of different size mandrels, the support 19 is adapted for sliding movement along the base plate or table 27, and is releasably secured in operative position by the bolt 29. It will of course be understood that the apparatus shown in Fig. 1 can be modified without departing from the spirit and scope of the invention and, if desired, both ends of the mandrel may be supported on centers, as in the conventional lathe, or on rollers with a driving force being applied directly to the mandrel itself.

Supported adjacent to and substantially parallel to the axis of the mandrel 11, by fixed structure not shown, is a guide track 31 on which is supported a carriage 33. The carriage 33 includes a bifurcated frame 35 having arms 37 which are grooved or channeled on their confronting faces at 39 to form guiding surfaces for the slidable support 41. Projecting from the side of the support 41 remote from the track 31 is a roller 43 which is resiliently maintained in engagement with the peripheral edge of the cam or pattern track 45 by the coiled compression spring 46 interposed between the frame 35 and support 41. The pattern track 45 is supported by any suitable fixed structure, not shown, and has its roller engaging surface or edge shaped to the desired configuration which is to be imparted to the tubing member. To prevent the slidable support 41 from being accidentally displaced from the frame 35, the outer ends of the channels are closed as shown, or otherwise provided with stops. Heating of the tubular material 9 is accomplished by the torch 47 fixed to the support 41 by bracket 48 and screws 49 and connected to a fuel supply, not shown, through the flexible hose 51. Setting or stabilizing of the deformed areas of the tubular material is facilitated by cooled air flowing through the hose 53 from a supply source, not shown, to the nozzle or jet 55 which has its outer end angled for improved directional air control. A bracket 48 and screws 49 are utilized to secure the jet 55 to the support 41 in trailing relationship to the torch 47 as determined by the direction of travel of the frame 35 along the track 31.

In practicing the method of the present invention, the mandrel, with the partially formed tubing snugly mounted thereon, is first positioned within the apparatus as shown in Fig. 1. The motor 23 is energized to rotate the mandrel 11 about its axis at a relatively high speed, as determined by the gear setting in the gear box 25, and the carriage 33 is then moved along the track 31, as indicated by the arrow 57, preferably at a constant speed. The coil spring 46 constantly urges the slidable support 41 radially toward the axis of the mandrel 11 causing its roller 43 to be maintained in engagement with the shaped edge of the pattern or cam track 45. It will be noted that the travel of the carriage 33 toward the left end of the apparatus, as viewed in Fig. 1, is accompanied by the concomitant movement of the support 41 radially toward and away from the mandrel. In this manner, the torch follows a curvilinear path with its flame impinging upon the tubing at certain desired or selected areas to soften the same, and with the greatest degree of heat being applied to the tubing material when the roller 43 rides along the hollowed portions or valleys of the cam track 45.

As the selected areas are softened, they are simultaneously stretched radially outward, by the centrifugal force developed by the rotating mandrel 11, into an arched or deformed position, as seen at the right side of Fig. 1. As the carriage 33 continues along its path, the bulged or deformed walls of the tubing are subjected to a chilling medium, preferably air, supplied through the nozzle or jet 55 to set or stabilize the arched walls so that further arching or collapse of the walls to their original position is not possible. To insure that only the desired areas undergo a stretching, especially where an abrupt arching is located adjacent to a section of the tubing which is intended to retain its original shape and size, removable band clamps 59 may be placed at spaced intervals as shown in Fig. 1. The clamps 59 serve additionally to secure the tubing material 9 snugly onto the mandrel 11 to prevent it from moving rotationally relative to the mandrel or axially in response to the stretching centrifugal force. Once the carriage reaches the end of its leftward travel, the rotary movement of the mandrel is stopped and the shaped tubing is removed. A new mandrel with a partially finished tubing may be then positioned within the apparatus for processing as described above, or a new section of tubing may be snugly telescoped or formed directly on the first mandrel employed.

It will be noted that the degree of deformation or bulging of the tubing walls is dependent upon the degree to which the wall is softened, and thus the alternating radial movement of the torch 47 combined with its longitudinal travel permits an arch of practically any desired configuration to be formed. In addition to varying the radial movement of the slidable support 41 relative to the mandrel axis, the degree of deformation of the tubing wall can be controlled also by varying the rotational speed of the mandrel 11, thereby subjecting the softened areas of the tubing to a greater or lesser centrifugal force depending upon the mandrel speed. Further control of the tubing deformation may be obtained by altering the speed of travel of the carriage 33 so that its movement is slower as it passes the selected wall areas of the tubing, thus causing the same to be heated for a longer time period and rendering them more plastic or flowable than the adjacent areas. For complex tubing configuration, it is of course obvious that a combination of any or all of the above-noted methods of controlling the softening or stretching forces on the tubing wall can be utilized.

In order that full advantage may be taken of the centrifugal or stretching force developed by the rotating mandrel 11, and to prevent collapse of the arched walls of the finished tubing, the mandrel 11 is provided with one or more longitudinally extending grooves 61 on its periphery to permit air to enter into the spaces formed as the tubing walls are urged outwardly. Further, the softening of the plastic material of the tubing may be accomplished by any suitable means other than that described above, as for example by heating the mandrel itself or by combined heating of the mandrel and by the torch 47, or electronically by a high frequency current induction oven. It will be understood that the heating torch 47 may remain stationary while the mandrel itself is moved axially relative thereto.

The finished tubing will have a configuration which resembles that of the curvilinear or shaped edge of the pattern or cam track 45, as best seen at the right side of Fig. 1. However, it will be understood that the invention is not intended to be limited to any particular cam track or other cam means or finished tubing configuration. The tubing, once removed from the mandrel 11, can be then severed into individual units for further fabrication into various finished articles. For example, the tubing shown in Fig. 1, after being cut into separate units, can have each unit closed at one end, for example at 63, to provide a receptacle or container 65 as shown in Fig. 2.

The finished shape of the receptacle 65 can be such as to merely present an attractive appearance or may be designed for imparting greater stability to the container or may render it particularly suited for easy gripping and handling by the ultimate users. When flexible plastic tubing members are employed, the finished receptacles may be employed as squeeze-type dispensers for discharging streams, sprays, or clouds of fluids or powders, with the arched or deformed wall areas of the receptacle providing a non-slip grip surface besides presenting an appealing ornamental design. Further, as shown in Fig. 3 the tubing, after being severed into sections, can be further cut longitudinally to provide a pair of decorative trays or other similar containers.

When a transparent tubing material is used, the structure shown in Fig. 3 can be utilized as decorative light transmitting means which can withstand loads greater than that of conventional structures in view of the arched construction. The finished products described above are in no way intended to limit the scope of the invention since it is of course obvious that the method and apparatus of the present invention is designed to form tubing applicable for numerous and varied uses.

It is seen from the above description that the objects of the invention are well fulfilled by the method and apparatus described. The description is intended to be illustrative only and it is to be understood that changes and variations may be made without departing from the spirit and scope of the invention as defined by the appended claims.

I claim:

1. A method of providing a tubing with a series of outwardly arched portions spaced along its length including the steps of sequentially softening selected wall areas of the tubing at longitudinally spaced intervals, exerting a continuously acting expansive force on the softened wall areas to impart a radially outward arching thereto, supporting the tubing against axial movement during the softening and arching thereof, and stabilizing the selected softened and arched wall areas while the expansion force is applied to set the same in their arched positions.

2. An apparatus for shaping tubing members including means for supporting and rotating a tubing member about its axis to impart a centrifugal stretching force to the wall thereof, a patterned guide member disposed adjacent to said supporting means, means for delivering a fluid against the tubing member for softening the wall thereof, said fluid delivery means mounted for movement along said guide member, means for advancing said fluid means along said guide member, said guide member being shaped as to cause said fluid delivery means to sequentially travel toward and away from the tubing member concomitantly as it is advanced along said guide member whereby only selected wall areas of the tubing member are softened and deformed into arched positions by the centrifugal stretching force, and means for stabilizing the deformed portions of the tubing in their arched positions.

3. A method of shaping tubing members including the steps of rotating the tubing about its axis to exert a centrifugal force on the wall thereof, softening selected wall areas of the tubing progressively along its length during the rotation thereof to cause the outward arching of the selected wall areas, supporting the tubing against axial movement during the softening and outward arching thereof, and progressively stabilizing the softened wall areas while said tubing is rotated to set the same in its arched position.

4. A method as set forth in claim 3 wherein said selected wall areas are softened by heat, with the heat source travelling along a path substantially parallel to the axis of the tubing while being concomitantly moved radially toward and away from said tubing at intermittent intervals.

5. A method as set forth in claim 3 in which the selected wall areas are softened by heat, with the heat source travelling along a path substantially parallel to the axis of the tubing with an intermittently accelerated movement.

6. A method as set forth in claim 3 in which the rotation of said tubing is varied in an alternating pattern to provide a varying centrifugal force concomitantly with the softening of said selected wall areas.

7. The method of shaping tubing members including the steps of fixing at least the ends of a tubing member to a mandrel telescoped within said tubing, uniformly rotating the mandrel about its axis to exert a constant centrifugal force on the tubing wall, progressively softening selected wall areas of the tubing between its ends while said centrifugal force is applied to cause the same to arch radially outward by stretching of the tubing between its fixed ends, and stabilizing the softened wall while the centrifugal force is continuously applied to set the same in its arched position.

References Cited in the file of this patent

UNITED STATES PATENTS

| | | |
|---|---|---|
| 617,922 | Buttler | Jan. 17, 1899 |
| 752,674 | Hays | Feb. 23, 1904 |
| 1,314,212 | Quimby et al. | Aug. 26, 1919 |
| 1,680,681 | Herzog | Aug. 14, 1928 |
| 2,427,722 | Greiner | Sept. 23, 1947 |
| 2,448,492 | Mayne | Aug. 31, 1948 |
| 2,546,208 | Barton | Mar. 27, 1951 |
| 2,683,333 | Canicoba | July 13, 1954 |

OTHER REFERENCES

Bailey: "Blow Molding Opens Opportunities to Plastics" in Plastics, vol. 2, No. 4, April 1945, pages 70, 82, 74, 75, 118, 119, and 120. Published by Ziff-Davis Publishing Co., Chicago, Illinois (only pages 74, 75 relied upon). (Copy in Scientific Library.)